(12) United States Patent
McDonald

(10) Patent No.: US 7,448,139 B2
(45) Date of Patent: Nov. 11, 2008

(54) SURVEYING STAKE CAP

(76) Inventor: Curt McDonald, 1960 Hidden Valley Rd., Howell, MI (US) 48843

( * ) Notice: Subject to any disclaimer, the term of this patent is extended or adjusted under 35 U.S.C. 154(b) by 0 days.

(21) Appl. No.: 11/712,157

(22) Filed: Feb. 28, 2007

(65) Prior Publication Data

US 2008/0201968 A1    Aug. 28, 2008

(51) Int. Cl.
   *G01C 15/00* (2006.01)
(52) U.S. Cl. .......................... 33/293; 52/103
(58) Field of Classification Search ................ 33/293; D10/66; 52/103
   See application file for complete search history.

(56) References Cited

U.S. PATENT DOCUMENTS

| | | | |
|---|---|---|---|
| 191,919 A * | 6/1877 | Bonner ........................ 52/103 |
| 1,272,430 A | 7/1918 | Hanson et al. | |
| 1,660,833 A * | 2/1928 | Cronjaeger .................. 33/293 |
| 1,950,298 A * | 3/1934 | Frost .......................... 40/124.5 |
| 2,181,033 A | 11/1939 | Watkins | |
| 3,321,834 A * | 5/1967 | Burns ......................... 33/293 |
| 3,503,163 A * | 3/1970 | Lutz ............................ 52/103 |
| 4,254,597 A * | 3/1981 | Feldman et al. ............. 52/103 |
| 4,549,360 A * | 10/1985 | Allen .......................... 33/293 |
| D289,859 S | 5/1987 | Johnson et al. | |
| 5,148,641 A * | 9/1992 | Rushing et al. ............. 52/103 |
| 2004/0168330 A1 * | 9/2004 | Kim ............................ 33/293 |

* cited by examiner

*Primary Examiner*—Christopher W Fulton
(74) *Attorney, Agent, or Firm*—Dickinson Wright, PLLC

(57) ABSTRACT

A survey marker cap assembly (20) includes a cylindrical body (22) that has a top (34) with a connection shaft (38) that extends upwardly from the center of the top (34) through a hole (42) presented by a circular disk (40) that is placed upon the top (34) of the cylindrical body (22). The connection shaft (38) presents a dome (44) that extends radially over the disk (40) to secure the disk (40) upon the cylindrical body (22) and the dome (44) presents a female dimple (46) therein for centering with a plumb bob. The cylindrical body (22) and disk (40) consist of the same or different metals and the cylindrical body (22) includes threads (32) disposed there within for placement on a surveying stake.

11 Claims, 2 Drawing Sheets

SURVEYING STAKE CAP

BACKGROUND OF THE INVENTION

1. Field of the Invention

The subject invention relates to a survey marker cap for placement on a survey stake.

2. Description of the Prior Art

Surveying has been an essential element in the development of the human environment since the beginning of recorded history (ca. 5000 years ago) and it is a requirement in the planning and execution of nearly every form of construction. Surveying is the technique and science of accurately determining the terrestrial or three-dimensional position of points and the distance and angles between them. Over time, the basic tools of planar surveying have evolved and utilize stakes to mark positions on land. Frequently, plastic caps are placed on each stake.

These prior surveying caps comprise a cylindrical body with a bore to receive the stake. It is placed on the survey stake. The cap includes a flat disk-like top presenting an ID for the surveyor. These caps are integrally formed in plastic into one single unit.

An example of such a cap is disclosed in U.S. Pat. No. D289,859 to Johnson et al. The Johnson patent discloses such a survey marker cap for placement on a survey stake. This cap has a frustum, or frusto-conical body, with a bore and an integral flat top closing the bore.

Although the prior art marker caps are very useful, the plastic caps can deteriorate in hostile environments, and are sometimes destroyed by animals.

SUMMARY OF THE INVENTION AND ADVANTAGES

The subject invention provides for a surveying stake cap that is placed on a surveying stake. The surveying stake cap includes a circular disk that is disposed on a flat top of a cylindrical body and is distinguished by a mechanical connection that extends from the cylindrical body and retains the disk on the flat top.

Accordingly, the invention provides an environmentally friendly survey marker cap that resists hostile environments and destruction by animals. The subject invention is also more cost efficient as the disk and cylindrical body are manufactured from mill stock as opposed to expensive specialized casting required for producing one single unit.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
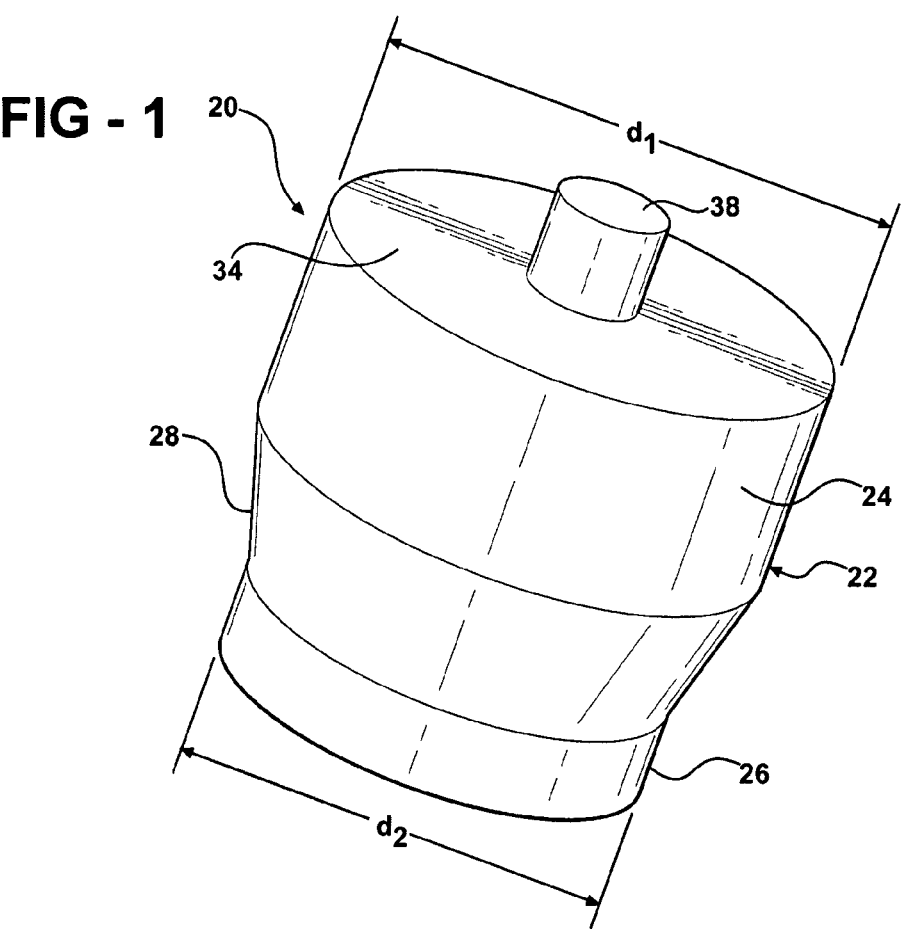
FIG. 1 is a perspective view of a cylindrical body utilized in the subject invention.
Figure 2:
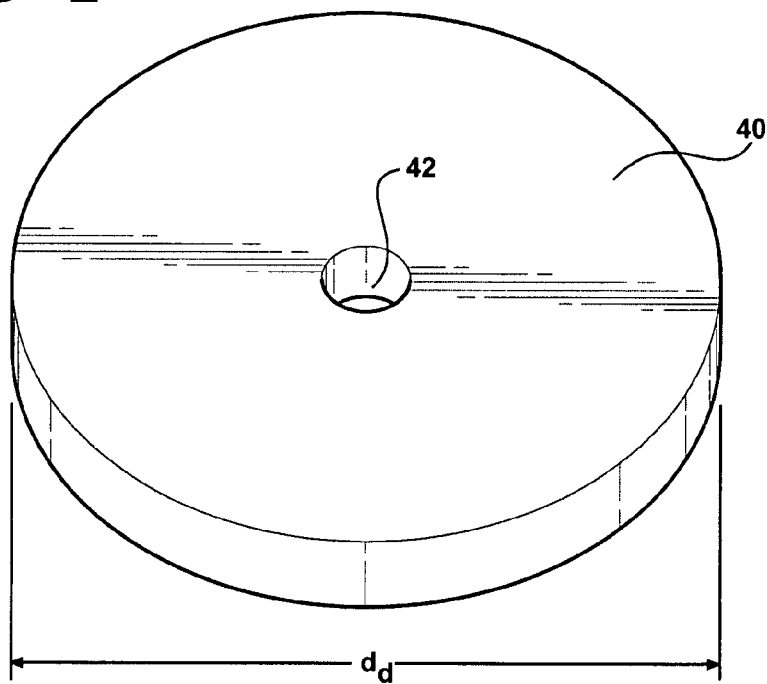
FIG. 2 is a perspective view of a disk utilized in the subject invention.
Figure 3:
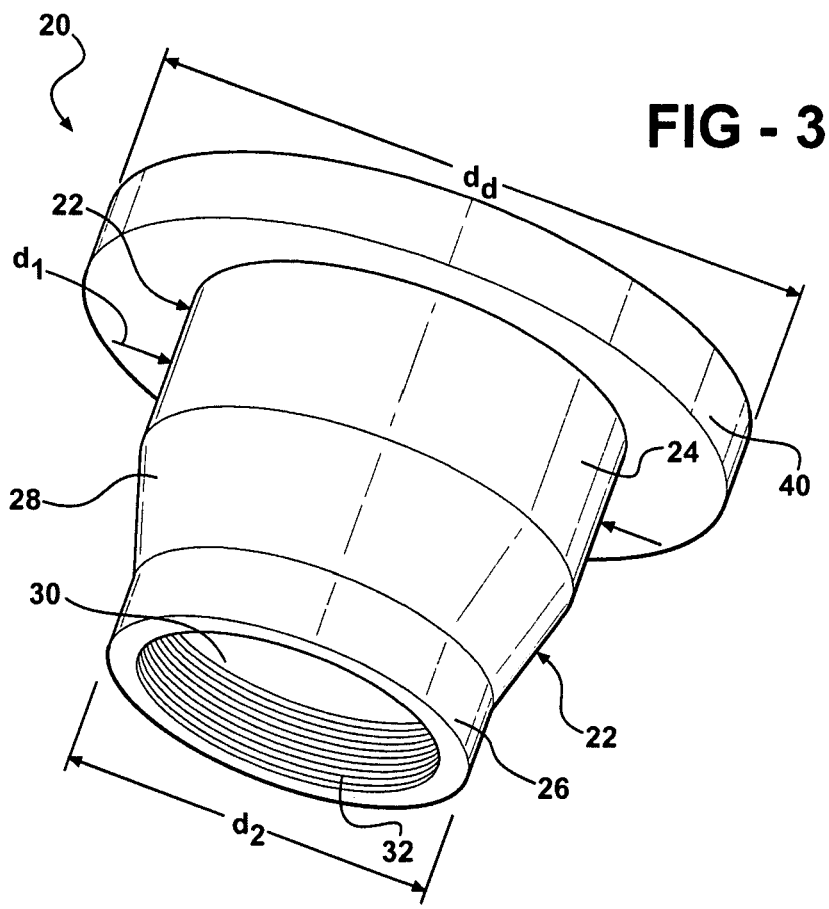
FIG. 3 is a perspective view of a first embodiment.
Figure 4:
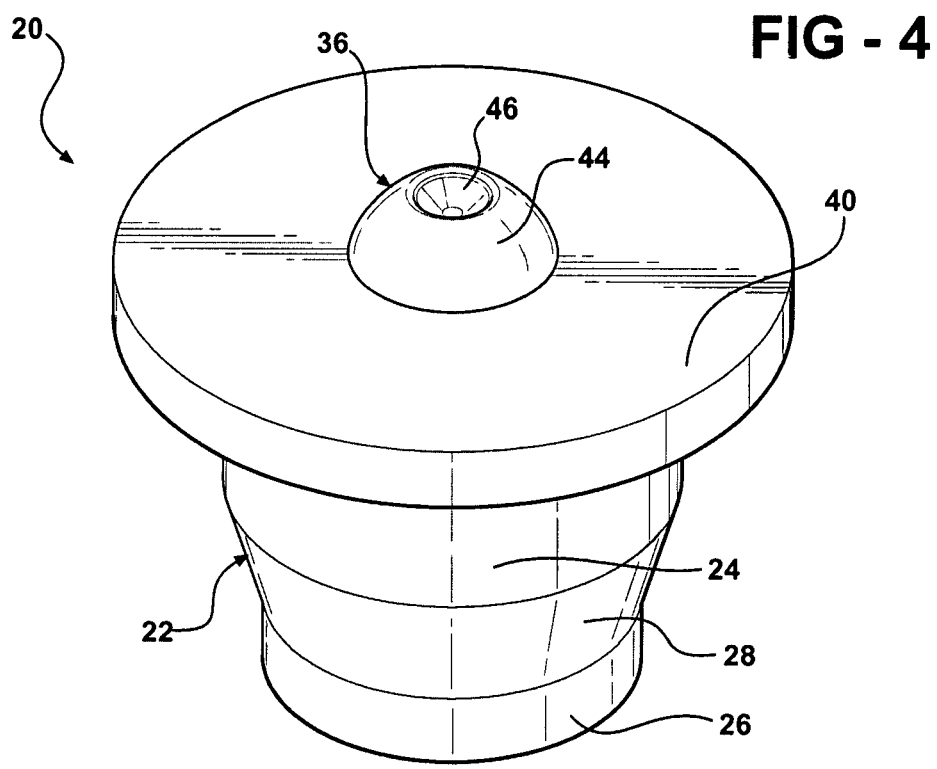
FIG. 4 is a perspective view of a second embodiment.

Referring to Figures, wherein like numerals indicate corresponding parts throughout the several views, a survey marker cap assembly 20 is generally shown for placement on a survey stake.

The assembly 20 comprises a cylindrical body 22 generally indicated having an upper portion 24 of a first diameter $d_1$ and a lower portion 26 having a second diameter $d_2$ smaller than the first diameter $d_1$. A conical section 28 interconnects the upper and lower portions 24, 26. These portions 24, 26 present a bore 30 of a tapered diameter. Threads 32 are disposed in the bore 30 to engage the survey stake. The cylindrical body 22 has a top 34 that closes the bore 30.

The assembly 20 is distinguished by a mechanical connection 36 generally indicated and includes a connection shaft 38 that extends upwardly from the center of the top 34 of the cylindrical body 22. The assembly 20 includes a circular disk 40 that has a disk diameter $d_d$ that is larger than the first diameter $d_1$ of the upper portion 24. The circular disk 40 presents a hole 42 in the center thereof and is disposed on the top 34. The connection shaft 38 extends through the hole 42 to complete the mechanical connection 36. The top 34 and circular disk 40 are either flat or dome shaped.

The connection shaft 38 is flattened or peened to present a dome 44 that extends radially over the disk 40 from the hole 42 to retain the disk 40 on the top 34. Simultaneously a female dimple 46 is formed at the center of the dome 44. The female dimple 46 therein can be used to receive a plumb bob for centering or alignment.

The cylindrical body 22 and the circular disk 40 generally consists of metal to resist degradation by the environment and/or animals, but may be any material known in the art such as aluminum, steel, brass, etc. The cylindrical body 22 and the circular disk 40 may consist of the same or different metals.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

| ELEMENT LIST | |
| --- | --- |
| Element Symbol | Element Name |
| 20 | survey marker cap assembly |
| 22 | cylindrical body |
| 24 | upper portion |
| 26 | lower portion |
| 28 | conical section |
| 30 | bore |
| 32 | threads |
| 34 | top |
| 36 | mechanical connection |
| 38 | connection shaft |
| 40 | circular disk |
| 42 | hole |
| 44 | dome |
| 46 | female dimple |
| $d_1$ | first diameter |

-continued

ELEMENT LIST

| Element Symbol | Element Name |
|---|---|
| $d_2$ | second diameter |
| $d_d$ | disk diameter |

What is claimed is:

1. A survey marker cap assembly (20) for placement on a survey stake comprising;
 a cylindrical body (22) having an upper portion (24) of a first diameter ($d_1$) and a lower portion (26) of a second diameter ($d_2$) smaller than said first diameter ($d_1$) and a conical section (28) interconnecting said upper and lower portions (24, 26),
 said portions (24, 26) presenting a bore (30),
 said cylindrical body (22) having a closed top (34) closing said bore (30),
 an independent circular disk (40) disposed over said top (34) and having a disk diameter ($d_d$) larger than said first diameter (d1) of said upper portion (24), and
 a mechanical connection (36) for retaining said disk (40) on said top (34).

2. An assembly (20) as set forth in claim 1 wherein said mechanical connection (36) includes a connection shaft (38) extending upwardly from the center of said top (34) and said circular disk (40) presents a hole (42) in the center thereof with said connection shaft (38) extending through said hole (42).

3. An assembly (20) as set forth in claim 2 wherein said connection shaft (38) presents a dome (44) extending radially from said hole (42) and over said disk (40).

4. An assembly (20) as set forth in claim 3 wherein said dome (44) presents a female dimple (46) therein for receiving a plumb bob for centering.

5. An assembly (20) as set forth in claim 1 wherein said cylindrical body (22) consists of a first metal and said disk (40) consists of a second metal.

6. An assembly (20) as set forth in claim 5 wherein said first and second metals are the same.

7. An assembly (20) as set forth in claim 5 wherein said first and second metals are different.

8. The assembly (20) as set forth in claim 1 wherein said top (34) and said circular disk (40) are either flat or dome shaped.

9. The assembly (20) as set forth in claim 1 including threads (32) disposed in said bore (30) for engaging the survey stake.

10. A survey marker cap assembly (20) for placement on a survey stake comprising;
 a cylindrical body (22) having an upper portion (24) of a first diameter ($d_1$) and a lower portion (26) having a second diameter ($d_2$) smaller than said first diameter ($d_1$) and a conical section (28) interconnecting said upper and lower portions (24, 26),
 said portions (24, 26) presenting a bore (30) of a constant diameter,
 threads (32) disposed in said bore (30) for engaging a survey stake,
 said cylindrical body (22) having a closed top (34) closing said bore (30),
 a connection shaft (38) extending upwardly from the center of said top (34),
 an independent circular disk (40) having a disk diameter ($d_d$) larger than said first diameter (d1) of said upper portion (24) and having a hole (42) in the center thereof,
 said disk (40) being disposed over said top (34) with said connection shaft (38) extending through said hole (42),
 said connection shaft (38) presenting a dome (44) extending radially over said disk (40) for retaining said disk (40) on said top (34),
 said disk (40) and said top (34) being either flat or dome (44) shaped,
 said dome (44) having a female dimple (46) therein for receiving a plumb bob for centering,
 said cylindrical body (22) consisting of a first metal and said disk (40) consisting of a second metal.

11. The assembly (20) as set forth in claim 10 wherein said first metal is different from said second metal.

* * * * *

UNITED STATES PATENT AND TRADEMARK OFFICE
CERTIFICATE OF CORRECTION

PATENT NO.         : 7,448,139 B2                              Page 1 of 1
APPLICATION NO. : 11/712157
DATED              : November 11, 2008
INVENTOR(S)        : Curt McDonald It is certified that error appears in the above-identified patent and that said Letters Patent is hereby corrected as shown below:

Column 3, line 24:  "diameter (d1) of said upper" should read --diameter ($d_1$) of said upper--.

Column 4, line 26:  "said first diameter (d1)" should read --said first diameter ($d_1$)--.

Signed and Sealed this

Nineteenth Day of May, 2009

JOHN DOLL
*Acting Director of the United States Patent and Trademark Office*